United States Patent

[11] 3,588,548

[72] Inventor Ioan Hugh Williams
Ammanford, Wales
[21] Appl. No. 792,308
[22] Filed Jan. 21, 1969
[45] Patented June 28, 1971
[73] Assignee Telephone Manufacturing Company Limited
[32] Priority Feb. 8, 1968
[33] Great Britain
[31] 6265/68

[54] DIGITAL LOW PASS FILTERS
9 Claims, 6 Drawing Figs.

[52] U.S. Cl. .......... 307/295,
307/233, 324/78, 328/140, 328/165
[51] Int. Cl. .......... H03k 1/16
[50] Field of Search .......... 307/295, 210, 233; 328/167, 165, 140, 136, 110, 134; 324/78 (D)

[56] References Cited

UNITED STATES PATENTS

| | | | |
|---|---|---|---|
| 3,147,434 | 9/1964 | Cocker | 328/140X |
| 3,445,685 | 5/1969 | Roth | 307/233X |
| 3,501,701 | 3/1970 | Reid | 328/134 |
| 3,509,476 | 4/1970 | Roth | 307/295X |

*Primary Examiner*—Stanley T. Krawczewicz
*Attorney*—Watson, Cole, Grindle & Watson

ABSTRACT: A low pass filter with sharp cutoff having a bandwidth variable at will employing digital circuitry.

INVENTOR
I. H. Williams
BY
Watson, Cole, Grindle & Watson
ATTORNEYS

INVENTOR
I. H. Williams
BY
Watson, Cole, Grindle & Watson
ATTORNEYS

INVENTOR
I. H. Williams
BY
Watson, Cole, Grindle + Watson
ATTORNEYS

DIGITAL LOW PASS FILTERS

This invention relates to low pass filters. An object of the invention is the provision of a low pass filter using a digital control system which is suitable for implementing on a single integrated circuit chip and which has a bandwidth which may be varied at will.

According to the invention there is provided a low pass filter comprising first comparison means arranged to compare the time during which the amplitude of an input signal exceeds a first datum level with a reference time interval determined by successive pulses in a train of strobe pulses of given frequency, to yield a first comparison output signal only when said signal persists at a level above said datum level during the occurrence of two said strobe pulses, means for storing said first comparison output signal, second comparison means arranged to compare the time during which the amplitude of said input signal is below a second datum level with said reference time interval to yield a second comparison output signal only when said signal persists at a level below said second datum level during the occurrence of two said strobe pulses, and output means responsive only to the coincidence of s stored first comparison signal and said second comparison output signal to yield an output from the filter.

It will be apparent that the upper cutoff frequency of a filter in accordance with the invention is a direct function of the frequency of the strobe pulse train which is applied to the filter so that by varying the strobe frequency the effective cutoff frequency can be varied at will without altering the circuit components.

Figure 1:
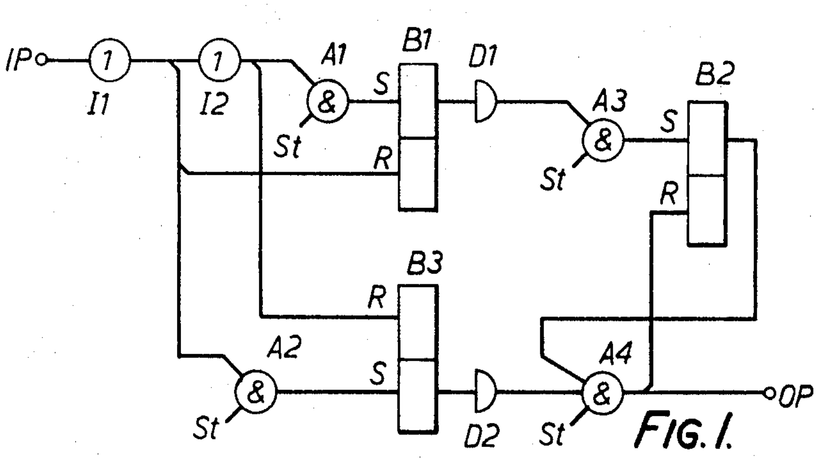
Figure 2A:
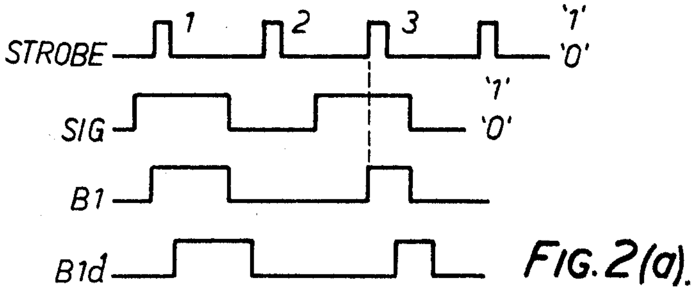
Figure 2B:
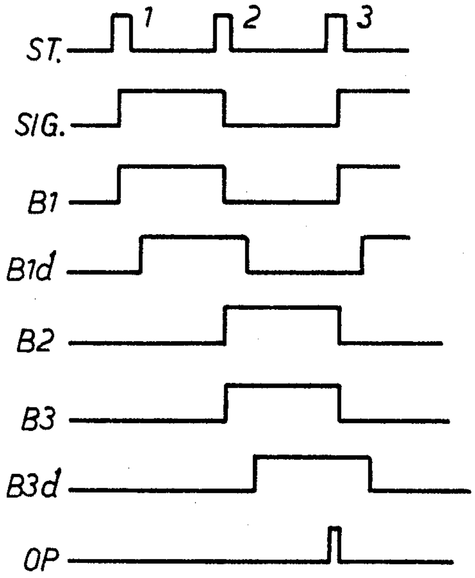
Figure 2C:
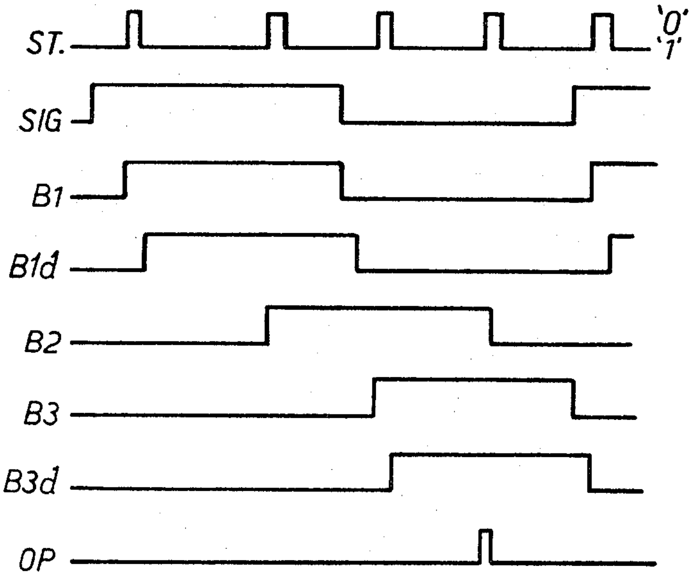
Figure 3:
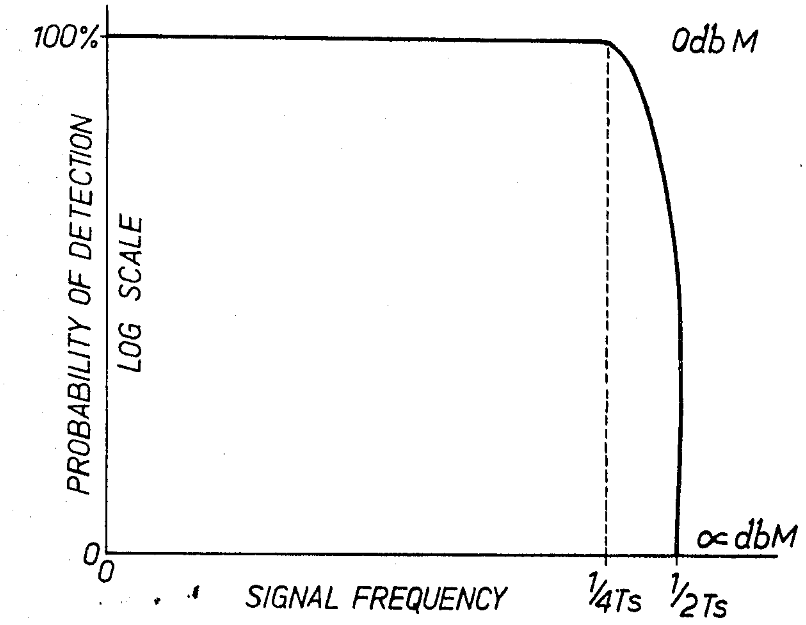
Figure 4:
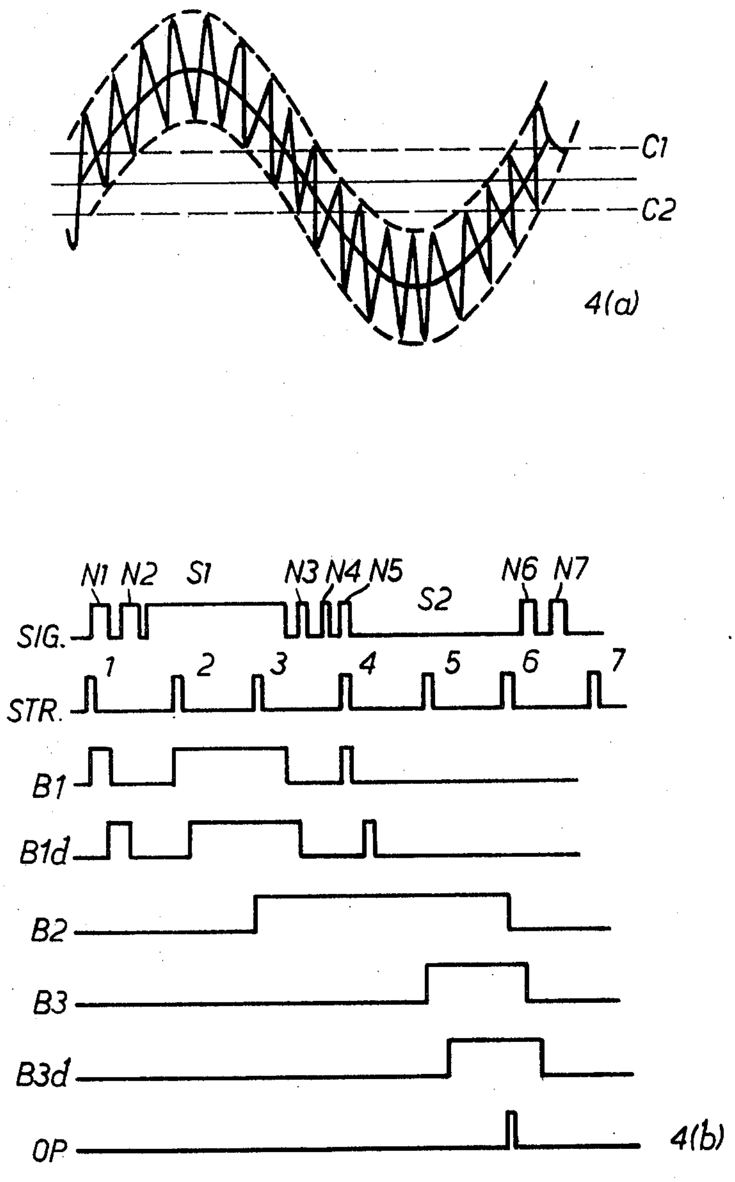

The various features and advantages of the present invention will be apparent from the following description of an embodiment thereof taken in conjunction with the accompanying drawings, in which:

FIG. 1 is a logic diagram of a digital low pass filter according to the invention, FIG. 2*a*, 2*b* and 2*c* shows various relations between signal and strobe (clock pulse) frequencies, FIG. 3 shows the band pass characteristic of the filter of FIG. 1, and FIG. 4 illustrates the detection of a high noise signal by the filter of FIG. 1.

Referring now to FIG. 1, the filter comprises two series inverters I1 and I2 three bistable elements B1, B2 and B3, two delay elements D1 and D2 and four AND gates A1, A2, A3 and A4. The input IP to the filter is connected to the series inverters I1 and the output of inverter I2 is connected to the one input of 2-input AND gate A1 and to the Reset input of bistable element B3. The junction of inverters I1 and I2 is connected to the Reset input of bistable element B1 and also to one input of 2-input AND gate A2. The outputs of AND gates A1 and A2 are connected to the Set inputs of bistables B1 and B3 respectively.

The output of bistable B1 is taken via a delay element D1 to one input of 2-input AND gate A3, the output of which is taken to the Set input of bistable element B2. The output of bistable B3 is connected via a delay element D2 to one input of 3-input AND gate A4. The output of bistable B2 is connected to the second input of AND gate A4 and the output of gate A4 is taken to the output terminal OP and also to the Reset input of bistable B2. The remaining inputs of gates A1 to A4 are connected to a strobe (clock) pulse supply S*t* (not shown).

The bistable elements B1, B2 and B3 are arranged to respond to logic 1 outputs from their respective controlling gates A1, A2 and A3 applied to their set inputs S, to set and remain set until reset by logic 1 signals applied to their reset inputs R, and the AND gate A4 is arranged to respond to the set condition of both bistables B2 and B3 at the time of occurrence of a strobe pulse to yield an output pulse at OP.

The time delay of each of the delay elements D1 and D2 is the same and is arranged to be longer than the duration of a strobe pulse from the supply S*t*. This ensures that a condition applied to AND gate A3 as a result of a logic 1 signal applied to gate A1 cannot be passed by gate A3 in response to the same strobe pulse as passed the logic 1 signal through gate A1 and similarly that a condition applied to gate A4 as a result of a logic 1 signal applied to gate A2 cannot be passed by gate A4 in response to the same strobe pulse as passed the logic 1 signal through gate A2.

A signal train of specific frequency applied to the input IP can be considered as a series of transitions between logic 0 an logic 1 levels alternating with transitions from logic 1 to logic 0 levels with the rate of alternation determined by the specific frequency of the signal train.

In response to such a signal train applied when the input level at IP is logic 0, the first transition to affect the filter is from logic 0 to logic 1.

With the signal at IP at logic 1 level the output from inverter I1 is a logic 0 which is ineffective to change either of bistable elements B1 or B3. The output of inverter I2 however is a logic 1 and its application to B3 ensures that the latter is in reset condition. The logic 1 output from inverter I2, being also applied to gate A1, sets bistable B1 upon the occurrence of the first strobe pulse coincident with or following the transition which produced the logic 1 output from inverter I2 and after the delay period of delay element D1, this set condition is applied as an input to gate A3. Provided that the input signal has not in the meantime changed to logic 0 level, the first strobe pulse to be applied to gate A3 after the delayed set condition has also been applied to this gate, causes a logic 1 signal of strobe pulse duration to be applied to the set input S of bistable B2 which is thus set and applies its set condition as an input to gate A4. Thus the state of the circuit when a transition from logic 1 to logic 0 levels in an input signal occurs and the logic 0 level persists for two strobe pulses is that bistables B1 and B2 are set so that one of the necessary inputs to gate A4 is applied, and bistable B3 is reset.

When the input IP to the filter changes from logic 1 to logic 0 level, the output from inverter I2 changes to a logic 0 and can have no effect on the bistable elements B1 and B3. The output of inverter I1 becomes, however, a logic 1 and this output applied to bistable B1 reset input R switches B1 to reset state. The same logic 1 is also applied to gate A2 and if it persists until a strobe pulse is applied to gate A2 from S*t*, a logic 1 signal of strobe pulse duration is applied to the set input S of bistable B3 which bistable is thus switched to its set state. After the delay period of delay element D2, the set condition of bistable B3 is applied as the second input to gate A4 and upon the occurrence of the next strobe pulse, provided the input level has not in the meantime reverted to logic 1 level, gate A4 is enabled and delivers a logic 1 output to OP. This logic 1 output from gate A4 is also applied to the reset input R of bistable B2 which is reset.

Thus when the logic 1 signal has been delivered to output OP the state of the circuit is that both bistable elements B1 and B2 have been reset and bistable element B3 is set.

It will be appreciated that there are two conditions to be satisfied before an output signal is delivered, firstly the input signal must persist at logic 1 level for two strobe pulses to ensure the setting of bistable B2 and secondly the input signal must then persist at logic 1 level for two strobe pulses to ensure the priming gate A4 by the delayed set condition of bistable B3. If either of these conditions is not met there is no output from OP.

Thus the bistable element B1 in conjunction with the gates A1 and A3 and the delay element D1 acts as a comparison means serving to compare the time during which an input signal persists at logic 0 level with a reference time interval determined by the occurrence of two successive strobe pulses. If the comparison shows that the persistence time of the signal is less than two clock pulses there is no output gate A3 and bistable B2 is not set, if the persistence time is greater than two clock pulses bistable B2 is set and functions as a storage means for the comparison output signal from gate A3.

Similarly the bistable element B3 in conjunction with the gates A2 and A4 and the delay element D2 acts as a comparison means for the time during which the input signal persists at logic 1 level and only when both comparison means apply a comparison output signal to gate A4 can the latter respond to a strobe pulse to yield an output signal.

The relationship between the frequency of the input signal and that of the strobe frequency, and also the effect of the phase relationship between the transitions in the input signal and the strobe pulses of the strobe pulse train, is illustrated in FIG. 2 of which the timing diagrams of FIG. 2*a* relate to the case where the frequency of the input signal is greater than one-half the strobe frequency, those of FIG. 2*b* relate to the limiting case where the input signal frequency is equal to the strobe pulse frequency and the and the transitions in the input signal coincide with the strobe pulses, and those of FIG. 2*c* relate to the case where the input signal frequency is one-fourth of the strobe frequency.

Referring now to FIG. 2*a*, bistable B1 sets on the first strobe pulse 1 after the input signal goes to logic 1 and resets when the signal reverts to logic 0. The output of delay element D2 is shown as D1*d* (B1 delayed). On the arrival of strobe pulse 2 at AND gate A3, output B1*d* is again at logic 0 and the gate A3 is inhibited. Bistable B3 cannot, therefore, be set and hence no output can be given via AND gate A4. An input frequency higher than one-half the strobe frequency is therefore rejected.

FIG. 2*b* shows the limiting case of an input frequency equal to the strobe frequency with the input steps occurring during the strobe time. The output B1*d* is now a 1 level on the arrival of strobe pulse 2. Bistable B2 is therefore set by strobe pulse 2 on gate A3. It can be seen that the input signal returned to 0 during strobe pulse 2 time but bistable B2 is still set because the delayed output B1*d* is still at logic 1.

Bistable B3 is set when the signal input reverts to 0 since strobe pulse 2 enables AND gate A2 during this period. The delayed output B3*d* is shown, from which it can be seen that, when bistable B3 is reset by the 1 output of inverter I2, output B3*d* is still at logic 1. With both signals B2 and B3*d* at logic 1, AND gate A4 is enabled by strobe pulse 3 and a pulse is supplied to the output OP.

In the limiting case example shown in FIG. 2*b* the chaNges in signal level occur during the strobe pulses such that each signal level is present for two (shared) strobe pulses. If the changes in level were noncoincident, it can readily be appreciated that no output would be given at terminal OP for the reasons given with reference to FIG. 2*a*.

The probability of detecting the signal is therefore dependent upon the duty cycle of the strobe pulses (i.e. on to off ratio). Thus if the pulses are on for 1 percent of the pulse repetition time, there is a 1 percent probability of detecting the input.

As the input frequency decreases from the limiting case of FIG. 2*b* towards the case of FIG. 2*c* the probability of detection increases until, when the input frequency is equal to one-fourth of the strobe frequency, the probability is 100 percent. Whatever the time relationship between the strobe pulses and the input signal, two strobe pulses appear during each "on" and each "off" signal period. Thus an output pulse is given in every case for input signal frequencies equal to or less than one-fourth of the strobe pulse frequency.

Since the probability of detection is reduced from 100 percent to zero in one octave the slope in db per octave is virtually infinite an cannot be achieved by any other known method. The pass band of the filter is shown in FIG. 3

It will also be appreciated that if the strobe pulse frequency is made variable, the cutoff frequency can be varied at will by very simple means without affecting the cutoff slope.

The filter is of particular value in detecting signals in the presence of higher frequency noise; provided that the signal-to-noise level exceeds 1:1.

FIG. 4*a* shows a sine wave input signal heavily modulated with higher frequency noise. This signal is detected by dipping between the two levels C1 and C2 which can be considered as logic 1 and logic 0 levels, and resultant waveform is given in FIG. 4*b*.

The first noise peak N1 is coincident with the first strobe pulse 1 and bistable B1 is set at the beginning of the strobe pulse and reset at the end of the noise pulse. Noise peak N2 is ignored due to there being no strobe pulse. Bistable B1 is again set by the first strobe pulse (2) appearing during the true signal level S1 and is reset at the end of signal S1. Noise peaks N3 and N4 are ignored, but bistable B1 is set and reset by noise peak N5 since it is coincident with a strobe pulse.

The delayed B1 output B1*d* follows the B1 output as previously explained.

Bistable B2 is set by strobe pulse 3 and the 1 output on B1*d* enabling AND gate A3.

Bistable B3 is set by strobe pulse 5 and the zero signal level S2 enabling gate A2.

With bistables B2 and B3 set, gate A4 is enabled by strobe pulse 6 and a pulse is given on the output terminal OP and B2 is reset simultaneously. Thus, the noisy input cycle has been detected and the noise eliminated from the output. In this manner, one output pulse is given for each input cycle.

Since the whole system is completely digital in nature, its realization is entirely suited to Integrated Circuit (IC) techniques and the entire realized system occupies only a small part of the average size of integrated circuit ship; particularly when multiphase clock systems using minimum area field effect transistors (FETs) are used. This allows a considerable amount of signal processing logic to be incorporated on the same chip with consequent reduction in cost and size, and an increase in reliability and noise immunity.

Although the system is suitable for static of dynamic logic systems, a dynamic system is preferred due to the considerably reduced power requirements. The optimum power reduction is achieved with two or four phase clock supply systems; the latter achieving the optimum packing density at the present time.

I claim:

1. A low pass filter comprising first comparison means arranged to compare the time during which the amplitude of an input signal exceeds a first datum level with a reference time interval determined by successive pulses in a train of strobe pulses of given frequency, to yield a first comparison output signal only when said signal persists at a level above said datum level during the occurrence of two said strobe pulses, means for storing said first comparison output signal, second comparison means arranged to compare the time during which the amplitude of said input signal is below a second datum level with said reference time interval to yield a second comparison output signal only when said signal persists at a level below said second datum level during the occurrence of two said strobe pulses, and output means responsive only to the coincidence of a stored first comparison signal and said second comparison output signal to yield an output from the filter.

2. A filter according to claim 1 wherein each of said comparison means comprises a bistable element arranged to be set to one of its stable states in response to said signal being at the relevant level when a first strobe pulse occurs and gate means responsive to the set state of said bistable means when the next strobe pulse occurs to yield a comparison output signal, said bistable element being arranged to be reset to its other stable state in response to the signal changing from said relevant level to the alternative level so that if said signal does not persist at the relevant level for two successive strobe signals no comparison output signal is produced.

3. A filter according to claim 2 including two inverters connected in series in the input to the filter, the output of one inverter being connected to the set input of the bistable element of one of said comparison means and the reset input of the bistable element of the other of said comparison means and the output of the other inverter being connected to the set input of the bistable element of said other comparison means and to the reset input of the bistable element of said one comparison means.

4. A filter according to claim 2 including delay means connected between said bistable element and said gate means, said delay means having a delay period greater than the duration of one strobe pulse so that said gate means cannot respond to the same strobe pulse as controlled the setting of said bistable element.

5. A filter according to claim 1 wherein said storage means comprises a bistable element arranged to be set to one of its stable states in response to the generation of one said first comparison output signals and to be reset in response to an output from said filter.

6. A filter as claimed in claim 5 wherein said output means comprises a three-input AND gate having one input connected to receive said strobe pulses a second input connected to be primed by the set state of said storage means bistable element, and a third input connected to receive said second comparison output signal.

7. A filter according to claim 2 wherein the set input of the bistable element of each said comparison means is connected to the output of a two-input AND gate one of the inputs of which is connected to receive said strobe pulses and the other of which is connected to receive a signal derived from the input signal to said filter.

8. A filter according to claim 1 wherein the active elements of the filter are field effect transistors.

9. A filter according to claim 8 wherein said transistors are realized in integrated circuit form on a single integrated circuit chip.